United States Patent
Sedarat et al.

(10) Patent No.: US 10,999,124 B1
(45) Date of Patent: May 4, 2021

(54) RAPID RATE ADAPTATION IN NBASE-T ETHERNET

(71) Applicant: Aquantia Corporation, San Jose, CA (US)

(72) Inventors: Hossein Sedarat, San Jose, CA (US);
Ramin Farjadrad, Los Altos, CA (US);
Kamal Dalmia, Fremont, CA (US);
Ramin Shirani, Morgan Hill, CA (US);
Seid Alireza Razavi Majomard,
Belmont, CA (US)

(73) Assignee: Marvell Asia Pte, LTD., Singapore (SG)

( * ) Notice: Subject to any disclaimer, the term of this patent is extended or adjusted under 35 U.S.C. 154(b) by 661 days.

(21) Appl. No.: 14/961,810

(22) Filed: Dec. 7, 2015

Related U.S. Application Data

(60) Provisional application No. 62/088,526, filed on Dec. 5, 2014.

(51) Int. Cl.
*H04L 12/24* (2006.01)
*H04L 12/825* (2013.01)

(52) U.S. Cl.
CPC .......... *H04L 41/0654* (2013.01); *H04L 47/25* (2013.01)

(58) Field of Classification Search
CPC .................. H04L 41/0654; H04L 47/25
See application file for complete search history.

(56) References Cited

U.S. PATENT DOCUMENTS

| | | | |
|---|---|---|---|
| 5,680,400 A | 10/1997 | York | |
| 5,692,013 A * | 11/1997 | Koslov | H04L 27/362 329/304 |
| 6,052,385 A | 4/2000 | Kanerva | |
| 6,081,523 A | 6/2000 | Merchant et al. | |
| 6,101,216 A * | 8/2000 | Henderson | H04L 1/0002 375/222 |
| 6,111,890 A | 8/2000 | Rao | |
| 6,121,890 A | 8/2000 | Rao | |
| 6,195,360 B1 | 2/2001 | Raza et al. | |
| 6,345,071 B1 * | 2/2002 | Hamdi | H04L 1/0001 370/252 |
| 7,027,407 B2 | 4/2006 | Diepstraten et al. | |
| 7,324,511 B2 | 1/2008 | Nishihara | |
| 7,525,992 B1 | 4/2009 | Shachal | |
| 7,567,620 B2 | 7/2009 | Rozental | |
| 7,593,431 B1 | 9/2009 | Lo et al. | |
| 7,693,240 B2 | 4/2010 | Mezer | |
| 7,720,075 B2 | 5/2010 | Costo | |
| 7,782,852 B2 | 8/2010 | Tellado et al. | |

(Continued)

OTHER PUBLICATIONS

Ken Christense et al., IEEE 802.3az The Road to Energy Efficient Ethernet, IEEE Communications Magazine, Nov. 2010, 7 Pages.

(Continued)

*Primary Examiner* — Alex Skripnikov
*Assistant Examiner* — Sharmin Chowdhury

(57) ABSTRACT

A method for fast link recovery for an Ethernet link is disclosed. The method includes detecting a drop in link quality and performing a first fast retrain sequence, including determining and exchanging THP coefficients based on the drop in link quality. If the performed fast retrain fails to recover the link, a data rate associated with the link is reduced, and a second fast retrain sequence performed.

18 Claims, 3 Drawing Sheets

(56) References Cited

U.S. PATENT DOCUMENTS

| | | |
|---|---|---|
| 8,112,646 B2 | 2/2012 | Tsai |
| 8,201,005 B2 | 6/2012 | Wertheimer et al. |
| 8,218,612 B2 | 7/2012 | Chien |
| 8,243,752 B2 | 8/2012 | Barkan |
| 8,276,013 B2 | 9/2012 | Diab et al. |
| 8,284,799 B2 * | 10/2012 | Diab .................. H04L 47/10 |
| | | 370/468 |
| 8,320,411 B1 * | 11/2012 | Sedarat .............. H04W 52/365 |
| | | 370/241 |
| 9,143,142 B2 | 9/2015 | Meagher |
| 9,294,355 B2 * | 3/2016 | Edwards .............. H04L 41/083 |
| 2002/0006167 A1 | 1/2002 | McFarland |
| 2002/0119783 A1 | 8/2002 | Bourlas et al. |
| 2003/0016797 A1 | 1/2003 | Zakrzewski |
| 2003/0040298 A1 | 2/2003 | Heatley |
| 2004/0184810 A1 | 9/2004 | Spilman et al. |
| 2005/0018784 A1 | 1/2005 | Kurobe |
| 2005/0030808 A1 | 2/2005 | Brown et al. |
| 2005/0036537 A1 * | 2/2005 | Zancho ............... H04L 25/0228 |
| | | 375/148 |
| 2005/0055467 A1 | 3/2005 | Campana et al. |
| 2005/0058152 A1 | 3/2005 | Oksanen et al. |
| 2005/0105545 A1 | 5/2005 | Thousand et al. |
| 2005/0152466 A1 | 7/2005 | Maltsev et al. |
| 2005/0259685 A1 | 11/2005 | Chang et al. |
| 2005/0286521 A1 | 12/2005 | Chiang |
| 2006/0109784 A1 | 5/2006 | Weller et al. |
| 2006/0153307 A1 | 7/2006 | Brown et al. |
| 2006/0215561 A1 | 9/2006 | Wang et al. |
| 2007/0192505 A1 | 8/2007 | Dalmia |
| 2007/0248024 A1 | 10/2007 | Conway et al. |
| 2008/0095188 A1 | 4/2008 | Remy |
| 2008/0151792 A1 | 6/2008 | Taich |
| 2008/0187028 A1 | 8/2008 | Lida |
| 2008/0225879 A1 * | 9/2008 | Powell ............. H04L 12/40039 |
| | | 370/445 |
| 2008/0294919 A1 | 11/2008 | Lida et al. |
| 2009/0080459 A1 | 3/2009 | Barkan |
| 2009/0150745 A1 | 6/2009 | Langner et al. |
| 2009/0282277 A1 | 11/2009 | Sedarat |
| 2010/0075704 A1 | 3/2010 | McHenry et al. |
| 2010/0115295 A1 | 5/2010 | Diab |
| 2010/0188980 A1 | 7/2010 | Desai et al. |
| 2010/0241923 A1 | 9/2010 | Wang et al. |
| 2011/0103459 A1 * | 5/2011 | Esmailian ......... H04L 25/03057 |
| | | 375/233 |
| 2011/0249687 A1 | 10/2011 | Diab et al. |
| 2012/0026922 A1 | 2/2012 | Diab |
| 2012/0063295 A1 | 3/2012 | Bliss |
| 2012/0106345 A1 | 5/2012 | Diab |
| 2012/0170591 A1 | 7/2012 | Diab et al. |
| 2012/0188894 A1 | 7/2012 | Huschke et al. |
| 2013/0070823 A1 | 3/2013 | Malkin et al. |
| 2014/0040704 A1 | 2/2014 | Wu et al. |
| 2015/0030337 A1 | 1/2015 | Mateosky |
| 2015/0067380 A1 | 3/2015 | Zhan et al. |

OTHER PUBLICATIONS

Hugh Barrass, EEE Exchange of Management Information, IEEE 802.3az EEE Task Force, Mar. 2009, Vancouver, British Columbia, 11 Pages.

Nariman Yousefi, Multi Rate PHY, IEEE Meeting Slides, Jul. 2003, 14 pages.

Zhang et al; IEEE Apr. 2010; pp. 843-855; "An Efficient 10GBASE-T Ethernet LDPC Decoder Design with Low Error Floors".

Mankar et al.; ACEEE, Proc of Intl. Conf. on Recent Trends in Information, Telecommunication and Computing, ITC; 5 pages; "Algorithms and Architectures for Reduced Complexity LDPC Decoding".

\* cited by examiner

United States Patent

RAPID RATE ADAPTATION IN NBASE-T ETHERNET

CROSS-REFERENCE TO RELATED APPLICATIONS

This application is a Non-Provisional that claims priority to U.S. Provisional Application No. 62/088,526, filed Dec. 5, 2014, entitled "Rapid Rate Adaptation in NBASE-T Ethernet", which is incorporated herein by reference in its entirety.

TECHNICAL FIELD

The disclosure herein relates to communications systems, and more specifically to high-speed Ethernet systems and methods.

BACKGROUND

Much of today's modern Ethernet infrastructure is based on twisted pair copper cables that meet certain specifications. One common "category" of Ethernet cable is identified as CAT5e, which is rated for data rates up to 1 Gbps. Recently, however, proposals have been made to use existing Ethernet infrastructure in the enterprise environment for data rates above 1 Gbps and up to 5 Gbps and beyond. Using cabling such as CAT5e at higher rates poses challenges such as alien crosstalk.

Alien crosstalk is particularly more challenging when the crosstalkers become active after the victim link is online. An activated cross-talker may affect an already established victim link in any one of several ways. For instance, the signal-to-noise ratio (SNR) in a victim link may drop such that data packets are lost continuously and at an excessively higher rate. Additionally, the SNR may drop so much that the victim link may drop, which would cause a few seconds of interruption during the data exchange.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Figure 1:
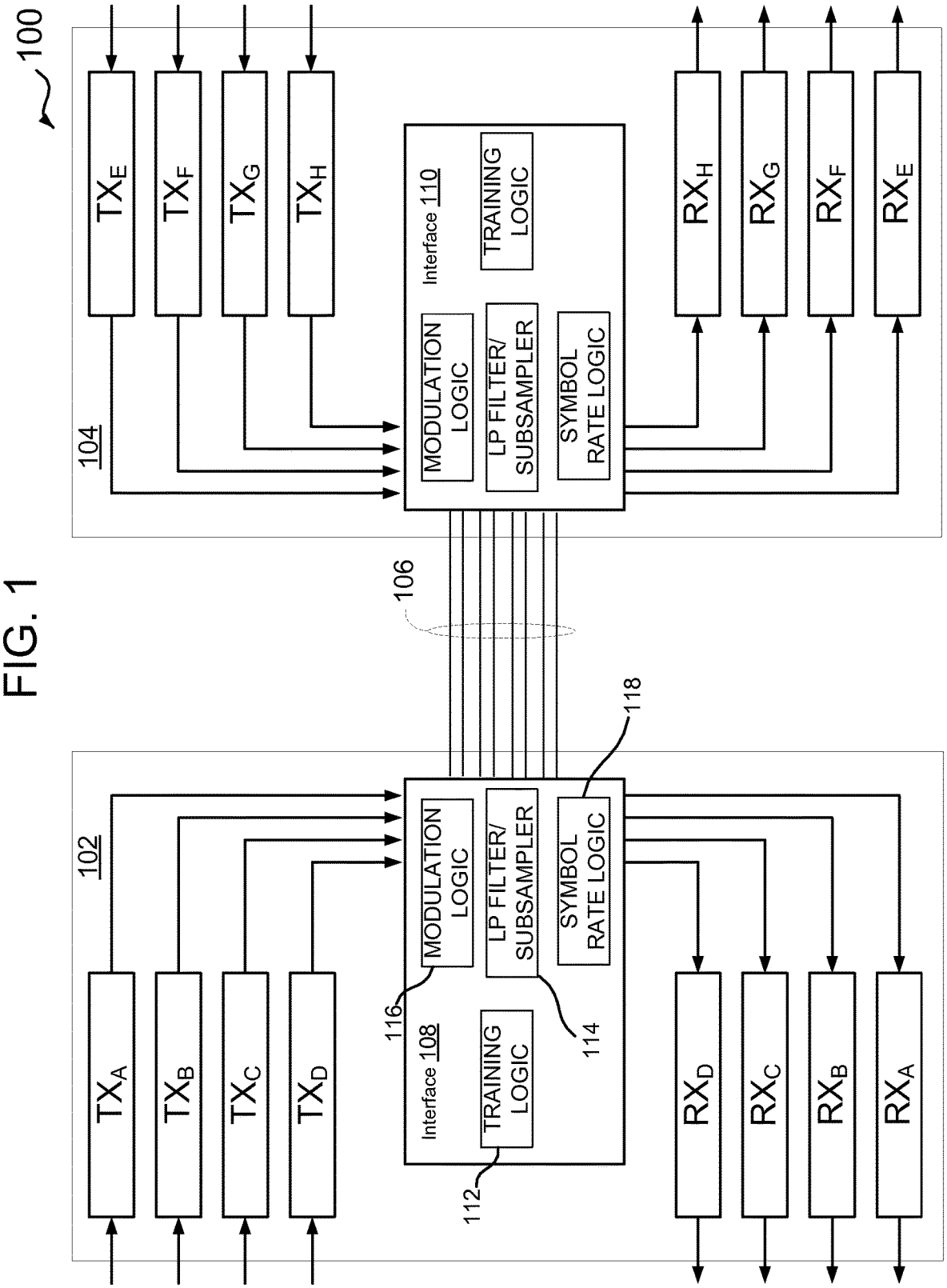
FIG. 1 illustrates a high-level transmitter/receiver (transceiver) channel architecture for an NBASE-T Ethernet transceiver.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_A$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as one similar to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

For one embodiment, the interface 108 for each chip includes training logic 112 that manages training steps for varying rate adaptations. The training logic directs rapid retrain operations for rate shifting between data rates due to alien crosstalk, as more fully explained below. The interface 108 may also include low pass filter circuitry and sub-sampling logic 114 to capture various link partner coefficients for various filters and parameters during a training operation involving one embodiment for changing the data rate as managed by the training logic. Other embodiments may employ modulation logic 116 and symbol rate logic 118 to vary a data modulation and/or a symbol rate. The various logic circuits associated with the interface may be shared amongst the channels, or provided as separate resources for each of the transceiver channels.

In one example, from the point of view of the first transceiver chip 102, data transmissions during a normal or regular operation mode from a local transmitter TX are provided to the interface 108, which outputs the data on a corresponding channel of the communication link 106. The data is received by the link partner, the second transceiver chip 104. The interface 110 of the transceiver 104 provides the received data to its receiver RX connected to that same channel. Furthermore, due to noise effects such as near-end crosstalk and echo, the data transmitted by the transmitters is also received by the near-end receivers in the same transceiver. Echo and crosstalk filters may be used to filter out this noise so that the receivers receive only data from other transceivers. In virtually all real scenarios, the data transmitted by a local transmitter has no dependence or relation with data being transmitted from far-end transmitter and received by the corresponding local receiver.

In many instances, enterprise applications that employ the channel architecture of FIG. 1 utilize thousands of such deployments, resulting in complex alien crosstalk environments.

Figure 2:
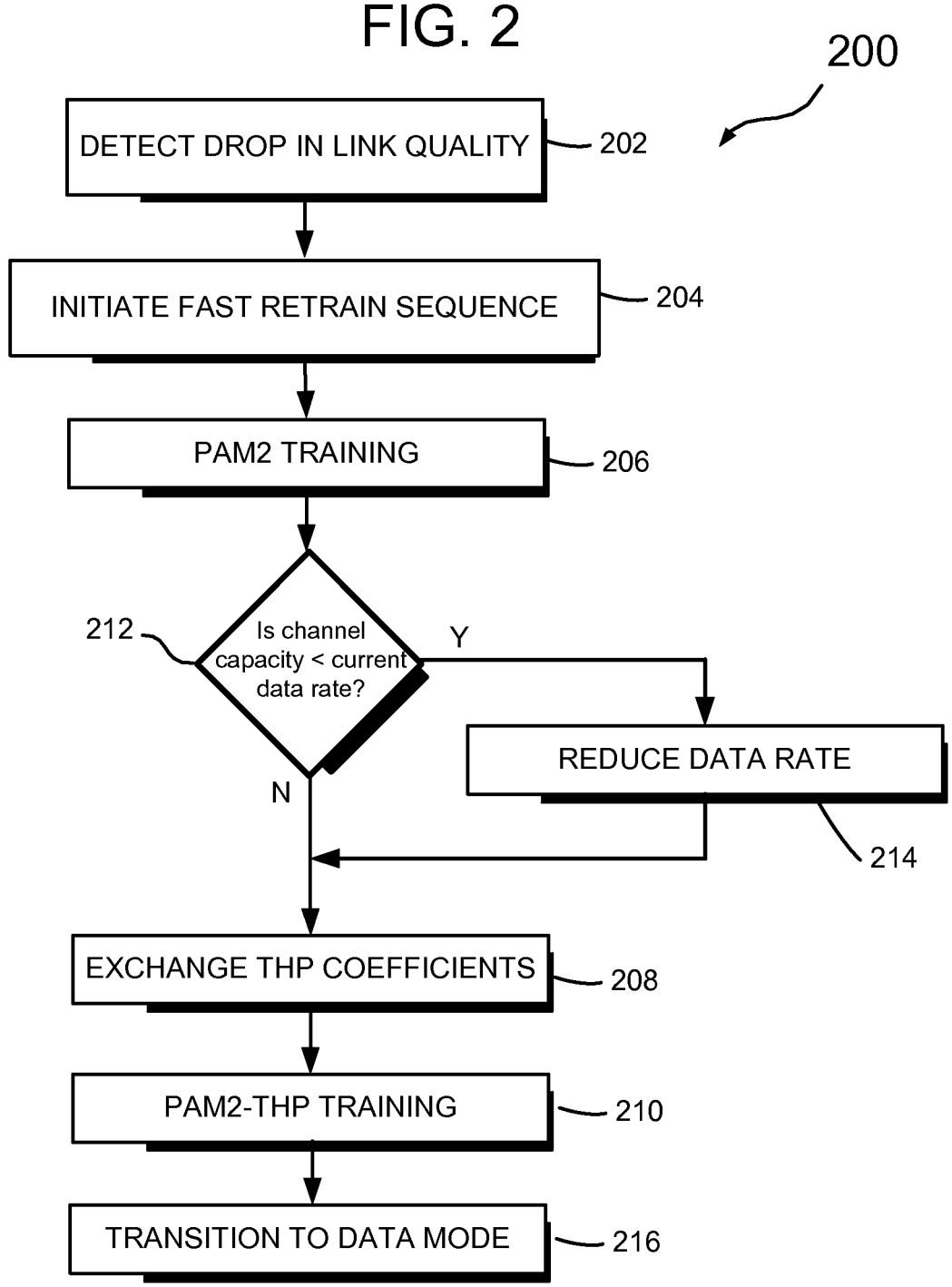
FIG. 2 illustrates a flowchart of steps for one embodiment of a method for performing a rapid rate adaptation for a link.

Referring now to FIG. 2, one embodiment of a method for rapid rate adaptation, generally designated 200, provides a mode of operation in an Ethernet transceiver that can enable a fast link recovery for a victim link affected by the presence of a new cross-talker. At 202, a reduction in link quality is detected that may exceed certain predefined criteria, such as a minimum SNR or rate of LDPC error frames or other LDPC statistics. In response to detecting the drop in link quality, a fast retrain sequence is initiated, at 204. A fast retrain is a brief link training sequence that resets a minimal number of link parameters to allow for changes in link parameters without necessarily requiring the link to go offline for a full autonegotiation and training cycle which may take a few seconds.

Further referring to FIG. 2, the fast retrain sequence is an abbreviated series of steps taken to train the parameters of a link to change link parameters without the link necessarily going offline, or to quickly achieve fully-functional nominal operation after a link has been lost. A full training sequence is often not needed in many cases after a link is lost, as many of the transceiver parameters may remain the same after retraining. FIG. 2 includes but one example of a fast retrain sequence. Further examples are described in U.S. patent application Ser. No. 12/604,358, titled "Fast Retraining For Transceivers in Communication Systems", filed Oct. 22, 2009, assigned to the assignee of the disclosure herein and incorporated by reference herein in its entirety.

Further referring to FIG. 2, in one embodiment, the fast retrain sequence first provides a PAM-2 transmission sequence, at 206. The PAM-2 training sequence allows updating of transceiver parameters. THP precoding coefficients as well as receiver equalizers and other filters can also be re-optimized due to the new noisy environment. The new THP coefficients are exchanged between link partners and the receiver synchronized with precoded transmission data from the far-end link partner transmitter, at 208. In other embodiments, other types, modulations, or formats of signals can be used for training signals as appropriate such as THP precoded PAM2 signal.

The next step in the fast retrain involves transmitting a PAM-2 sequence with a Tomlinson-Harashima Precoding (THP) type of encoding, or PAM2-THP training phase, at 210.

Further referring to FIG. 2, at 212, a determination is made as to whether the fast retrain successfully recovered the SNR. A typical fast retrain of the filters can recover the SNR when the new noise environment is not severe. Examples of noise sources that a fast retrain can successfully recover the link are: narrowband RFI noise, low frequency alien crosstalk from other links at lower data rates, low power wideband alien crosstalk, etc. If the new noise source is severe enough, the link capacity may drop below the current data-rate. In that case, even a full training of the precoder and the receiver filter does not yield enough SNR to sustain the current data-rate. At this point an evaluation is made to determine whether the link capacity is high enough to support current data-rate. This evaluation may be based on factors such as total power of receiver error, power spectral density (PSD) of the receiver error (to identify RFI noise source, low frequency alien crosstalk, etc), time or frequency responses of filters, etc. If it is determined that the channel capacity can support the current rate, the fast retrain may continue and/or some stages of it may be repeated for further receiver optimization and SNR recovery.

With continued reference to FIG. 2, if it is determined at 212 that current data rate is not sustainable, then the link data rate may be reduced, at 214. The link data rate reduction may be handled, for example, by reducing the rate by a fixed increment or through an adaptation or prediction process. As an example, for a link initially operating at 10 Gbps, a reduction to 5 Gbps might be a first decrement, followed by a reduction to 2.5 Gbps if the 5 Gbps rate is too high. Alternatively, the reduction from 10 Gbps to 2.5 Gbps may be done in one step if it is determined that 5 Gbps is not sustainable. Embodiments of methods to reduce the link data rate in a manner that allows for fast retraining are described below.

Once the determination of data rate reduction is done in 212, that information and the follow up coordination is done through Infofield exchange.

The reduction in data-rate may be done in a number of ways. In one embodiment, the baudrate and the signaling bandwidth is reduced. For instance, a 5 Gbps link at 200 MHz baudrate is reduced to 2.5 Gbps link with a baudrate of 100 MHz. In another embodiment, the baudrate is fixed while a sparser constellation is used. For instance, a 5 Gbps link using PAM16 modulation at 200 MHz is reduced to a 2.5 Gbps link using PAM4 modulation at the same baudrate of 200 MHz. In a third embodiment, the number of transmit lanes are reduces while the baudrate and modulation is kept the same. For instance, a 5 Gbps link using PAM16 modulation at 200 MHz over 4 lanes is reduced to 2.5 Gbps link over 2 lanes using the same modulation and baudrate. There is also possibility of mixing some of these methods. For instance, both number of lanes and constellation density may be properly reduced to support a lower rate at the same baudrate. These methods may have some advantages and potentially some disadvantages.

Figure 3:
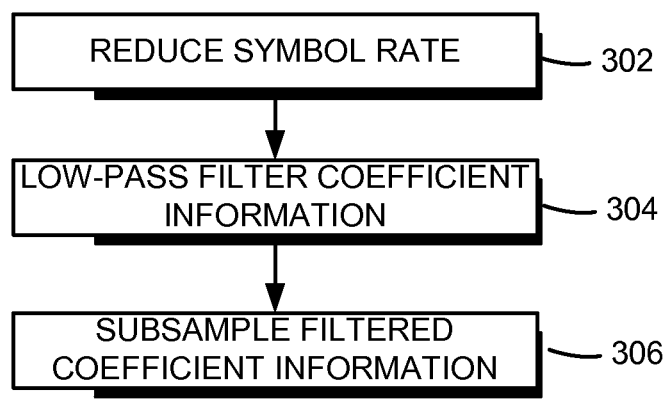
FIG. 3 illustrates a flowchart of steps for one method of initially determining filter coefficients for a rapid data rate change.

Referring now to FIG. 3, one specific embodiment to reduce the link data rate involves changing the baud rate, or symbol rate, while maintaining the data modulation scheme (such as PAM-16). Thus, for one example, a link that is initially operating at 5.0 Gbps may have a baud rate of 200 Mhz, and modulating data into PAM-16 constellations, each constellation providing a symbol representation of four data bits. Once the link pair determines that a rate adjustment should be made in the fast retrain sequence, the transmit baud rate is reduced, and the receiver rate correspondingly reduced at each link partner. The link-partners signal to each other the desire to reduce the baudrate through proper communication with Infofield exchange. If at least one link-partner request a lower baudrate the 2 sides of the link transition simultaneously to the lower rate through a similar Transition Count Down mechanism as specified by the IEEE 10GBASE-T Ethernet training protocol. Once the baudrate is changed the receiver and transmitter parameters are re-optimized for the new rate through training.

Reducing the data-rate through a baudrate reduction has the advantage of minimizing the transmit emission and crosstalk as well as the susceptibility to receive noise, echo, disturbance and crosstalk. However, baudrate reduction may require a relatively long time to optimize the receiver and transmitter operating parameters. A reduction in baudrate results in lower signaling bandwidth. Since the channel and transceiver operating parameters are already known for a wider band signaling, it is possible to derive the same parameters for lower signal bandwidth. This can significantly reduce the training time to find the optimal transceiver parameters. For instance, the PBO in the new lower rate can be deterministically mapped from the PBO value at the old higher rate. Each link-partner can independently set the new PBO for its own transmitter and this value is known to the link-partner without any need to exchange the information, hence reducing the training time. The effect of the new PBO can also be compensated in far-end receiver gain as well as various filters with no additional training.

Training for optimal filters and precoder may take a long time. Proper initialization of these filter can significantly reduce the training time. Various channels information (insertion loss, echo, near-end and far-end crosstalk) can be estimated over the wider bandwidth using the filters and other transceiver parameters from the high datarate mode. Knowing the channel information at higher bandwidth, one can derive the channel response at the relevant bandwidth corresponding to lower datarate. From the channel information, the new filter settings or other transceiver parameters may be derived. Knowing the optimal filter settings at wider bandwidth, one can derive the proper initial settings by low-pass filtering the optimal coefficients from higher baudrate and down-sampling them to create the proper initial settings for the lower baudrate. The low-pass filter used in this calculation may be the combination of transmit and receive low-pass filters used in the signal path at lower rate. For example, at an original data rate of 5 Gbps, respective echo, NEXT and FEXT filters mimic the echo channel and near-end crosstalk channel up to a bandwidth of 200 MHz (corresponding to the 5 Gbps data rate). In changing the data rate to, for example 2.5 Gbps, and lowering the symbol rate to a corresponding bandwidth of 100 MHz, at 302, the filter information has already been determined for that range as a subset of the 200 MHz bandwidth. The tap filter information for the echo, NEXT and FEXT filters can thus be quickly obtained by passing the tap filter information through the low-pass filter circuitry (that mimics the chip front-end low-pass filter), at 304, then subsample the output of the filter, at 306. The resulting tap coefficient information from the subsampling logic provides a good starting point for the tap filter coefficients, allowing the filters to adaptively convolve to an optimal solution.

An initial starting point for the THP coefficients may be handled similar to the echo, NEXT and FEXT filters described above, by passing the tap filter information through the low-pass filter circuitry, then subsampling at a rate that matches the reduced baud rate. However, for THP coefficients, an implied unity term should also be processed with the coefficients employed by the various THP filter taps.

Quickly generating filter tap information for the reduced data rate, as described above for one embodiment, allows the fast retrain process described herein to effectively operate to maintain link status during rate changes to mitigate the effects of alien crosstalk interference.

Figure 4:
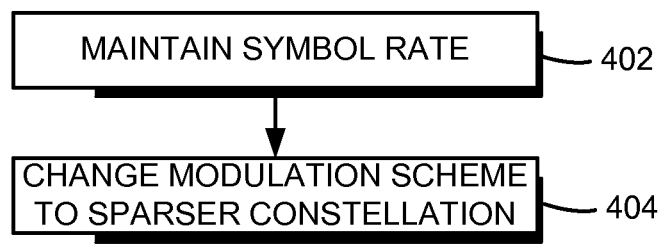
FIG. 4 illustrates a flowchart of steps for a further method of rapidly changing an Ethernet link data rate.

FIG. 4 illustrates a flowchart showing steps employed in a method to reduce a link data rate that supports a fast retrain process in accordance with another embodiment. The method involves maintaining the baud (or symbol) rate, at 402, but changing the modulation scheme, at 404. For example, a link originally operating at 5 Gbps may be operating at a symbol rate of 200 MHz and employing a PAM-16 modulation scheme that codes four bits of information into one symbol. Changing the modulation to PAM-4, where each symbol is represented by a sparser constellation, thus reduces the number of data bits to two, but at the same symbol rate.

Since the constellation is sparser, (fewer bits that are farther apart in constellation space), the resulting SNR requirement is significantly lower. Moreover, since the symbol rate and corresponding link bandwidth stay the same, there is no change in the transceiver optimal settings. The reduced data rate is thus immediate for fast retrain purposes.

For one embodiment, during the fast retrain process, the link partners communicate with each other using an Infofield Exchange protocol to agree to utilize the PAM-4 modulation following the PAM-2 initial retrain sequence in "PCS Test" mode. In some embodiments, changing the data modulation scheme while maintaining the same baud rate may use power settings that are higher than needed. In such cases, the power back off (PBO) settings may be increased so that transmit emission and crosstalk is minimized. The new PBO settings may be negotiated using an Infofield exchange protocol at transition to PAM2-THP. The changes in modulation is negotiated using Infofield exchange at transition to PCS_Test. The changes in the PBO and/or constellation do not have to be symmetric. For instance, if one link-partner experiences a new severe noise environment, it may request a new constellation while the other link-partner may operate well with the old constellation. In that case, one link-partner may down shift the data rate, while the other one stays at the old high data rate. Note also that the changes in modulation do not have to be uniform across lanes. It is possible to use a very sparse constellation for lanes with very poor SNR while the other lanes that experience weaker noise maintain a denser constellation. In the extreme case that a lane is exposed to excessive amounts of noise, that lane may be completely shut off carrying no signal nor data.

Those skilled in the art will appreciate the benefits and advantages provided by the embodiments described herein. Rapidly rate shifting a high-speed Ethernet data rate in a manner that allows for a fast retrain sequence enables an Ethernet link to quickly adapt its data rate to changes in link operating environments, such as when alien crosstalk affects a given link.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method for fast link recovery for an Ethernet link, the method comprising:
    operating the Ethernet link at a first data rate using an adaptive filter having first filter coefficients based on the first data rate;
    detecting a drop in link quality on the Ethernet link;
    performing a first fast retrain sequence to improve the link quality; and
    if the first fast retrain sequence fails to recover the link quality, reducing the first data rate to a reduced data rate, and performing a second fast retrain sequence including low-pass filtering the first filter coefficients to obtain filtered coefficients and subsampling the filtered coefficients to generate updated filter coefficients for the adaptive filter.

2. The method according to claim 1, wherein reducing the first data rate comprises:
    reducing a first symbol rate associated with the first data rate along the Ethernet link; and
    maintaining a modulation scheme associated with the first data rate.

3. The method according to claim 2, wherein the low-pass filtering comprises:
    receiving filter coefficient information from a link partner;
    low-pass filtering the filter coefficient information.

4. The method according to claim 2, wherein the subsampling comprises:
    subsampling at a rate that matches the reduced first symbol rate along the Ethernet link.

5. The method according to claim 2, wherein:
    operating the Ethernet link at a first data rate comprises operating the Ethernet link at a rate of 5 Gbps;
    reducing a first symbol rate comprises reducing the first symbol rate from 200 MHz to 100 MHz; and
    maintaining the modulation scheme comprises maintaining a PAM-16 modulation.

6. The method according to claim 1, wherein reducing the first data rate comprises:
    maintaining a constant symbol rate; and
    changing a first modulation scheme associated with the first data rate to a different modulation scheme that includes a sparser constellation.

7. The method according to claim 6, wherein:
    operating the Ethernet link at a first data rate comprises operating the Ethernet link at a rate of 5 Gbps;
    maintaining the constant symbol rate at 200 MHz; and
    changing the first modulation scheme to generate symbols having fewer data bits.

8. The method according to claim 7, wherein changing the first modulation scheme comprises:
    changing the first modulation scheme from PAM-16 to PAM-4.

9. The method according to claim 1, wherein reducing the first data rate comprises:
    communicating between link partners via an InfoField Exchange protocol; and
    agreeing to reduce the first data rate through a symbol rate change and/or a data modulation change.

10. The method according to claim 1, wherein detecting the drop in link quality comprises analyzing a power spectral density (PSD) characteristic.

11. An integrated circuit (IC) Ethernet transceiver chip comprising:
    adaptive filter circuitry including filter taps having first filter coefficients based on a first data rate;
    modulation logic to modulate transmit data into symbols and to demodulate received symbols into data;
    symbol rate logic to establish a symbol rate with a link partner and to transceive data symbols with the link partner at a selectable symbol rate;
    detection circuitry to measure a drop in link quality; and
    training logic to, when a drop in link quality is detected, perform a first fast retrain sequence to improve the link quality and if the first fast retrain sequence fails to recover the link quality, reduce a data rate associated with the link from the first data rate to a reduced data rate that is less than the first data rate, the training logic to perform a second fast retrain sequence including low-pass filtering the first filter coefficients to obtain filtered coefficients and subsampling the filtered coefficients to generate updated filter coefficients for the adaptive filter.

12. The IC Ethernet transceiver chip according to claim 11, wherein the adaptive filter circuitry includes at least one filter from the group including echo filter circuitry, near-end crosstalk (NEXT) filter circuitry and far-end crosstalk (FEXT) circuitry.

13. The IC Ethernet transceiver chip according to claim 11, wherein the training logic further comprises:
low-pass filter circuitry to receive filter coefficient information from the link partner during an exchange process at the reduced data rate; and
subsampling circuitry to subsample the filtered coefficient information.

14. The IC Ethernet transceiver chip according to claim 13, wherein the symbol rate logic is responsive to the training logic to reduce the data rate from the first data rate to the reduced data rate by reducing a symbol rate.

15. The IC Ethernet transceiver chip according to claim 13, wherein the modulation logic is responsive to the training logic to reduce the data rate from the first data rate to the reduced data rate by changing a data modulation scheme.

16. The IC Ethernet transceiver chip according to claim 11, wherein the detection circuitry is configured to detect at least one of signal-to-noise ratio (SNR) and power spectral density (PSD).

17. The method according to claim 1, wherein the performing the first fast retrain sequence comprises training the Ethernet link without first performing an autonegotiation sequence.

18. The IC Ethernet transceiver chip according to claim 11, wherein the training logic is configured to perform the first fast retrain sequence by training the link without first performing an autonegotiation sequence.

* * * * *